May 10, 1927.
B. J. MARTIN
PNEUMATIC STEERING DEVICE FOR VEHICLES
Filed May 4, 1925
1,627,568
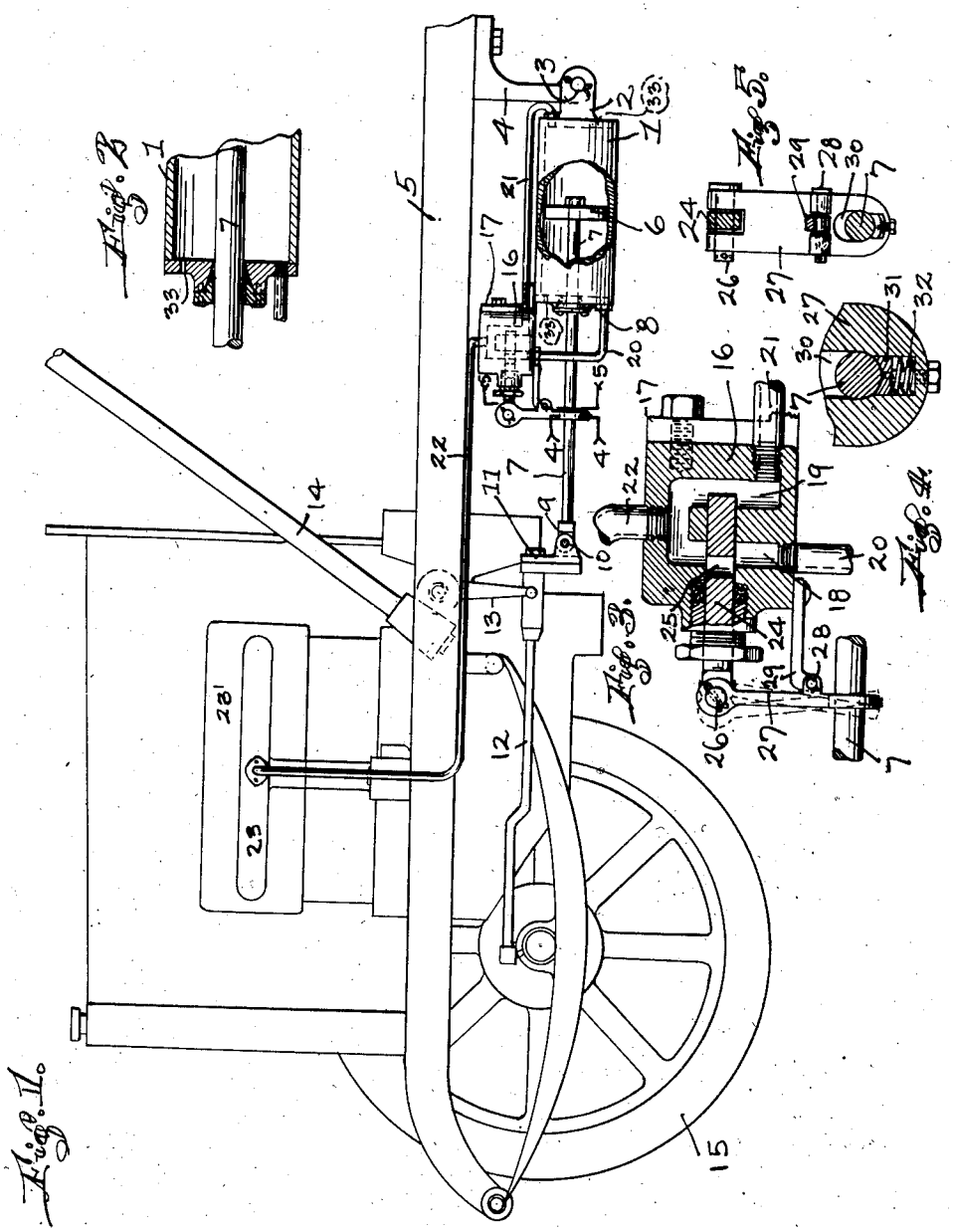
INVENTOR
BETHEL J. MARTIN
BY - ATTY Patented May 10, 1927.

1,627,568

UNITED STATES PATENT OFFICE.

BETHEL J. MARTIN, OF SAN FRANCISCO, CALIFORNIA.

PNEUMATIC STEERING DEVICE FOR VEHICLES.

Application filed May 4, 1925. Serial No. 27,697.

This invention relates particularly to a power steering device for vehicles.

An object of the invention is to provide a pneumatically operated device connected to the steering apparatus of an automotive vehicle to effect movement of said steering apparatus.

A further object of the invention is to provide, in conjunction with the conventional steering apparatus of a motor vehicle, an auxiliary power device for effecting movement of the steering apparatus through movement initiated and controlled by a manually operated handle.

In this specification and the annexed drawings, the invention is illustrated in the form considered to be the best but it is to be understood that the invention is not limited to such form, because it may be embodied in other forms, and it is also to be understood that in and by the claims following the description, it is desired to cover the invention in whatsoever form it may be embodied.

In the accompanying one sheet of drawings—

Fig. 1 represents a diagrammatic side elevation of a vehicle having a power steering apparatus, constructed in accordance with my invention, applied thereto.

Fig. 2 is an enlarged end section through the power cylinder.

Fig. 3 is an enlarged cross section through the control valve.

Fig. 4 is a fragmentary section taken through Fig. 1 on the line 4—4.

Fig. 5 is a section taken through Fig. 1 on the line 5—5.

A great many of the heavier automotive vehicles, such as trucks and the larger types of automobiles, are extremely difficult to be steered by the average person. The adding of "balloon" tires to the front wheels has served to increase the tractive efficiency of the wheels but at the same time has increased the power effort neccessary to steer such wheels. In my invention I have provided auxiliary apparatus which may be attached to the conventional steering apparatus of any automotive vehicle so as to aid the vehicle operator in steering the said vehicle.

In detail, the construction illustrated in the drawings comprises, a cylinder 1 closed at each of its opposite ends. One end of tne cylinder is provided with a projection 2 thereon, which is pivoted, at 3, to an end of a bracket 4 secured on the frame 5 of a vehicle. A plunger or piston 6 is reciprocatingly mounted in the cylinder 1 and a rod 7 is secured to the piston 6. The rod 7 extends outwardly through a suitable bearing 8 provided in the free end of the cylinder 1, and the free end 9, of the shaft 7, is pivoted at 10, to a yoke 11, fixedly secured on the drag link 12 of the vehicle steering apparatus. The drag link 12 is universally connected to a quadrant lever 13 arranged on the vehicle frame 5 adjacent the steering column 14. Rotation of the steering wheel mounted on the steering column 14 imparts an arcuate movement to the lever 13 which in turn actuates the drag link 12 and the steering apparatus to cause the wheels 15 to be turned.

In every vehicle steering apparatus there is a certain amount of loose-play which I utilize to advantage for the operation of my invention. Adjacent the cylinder 1, I have arranged a valve block 16 which is secured to the frame 5 by a bracket 17. The valve block 16 is provided with a pair of chambers 18 and 19 therein, the chamber 18 being connected by a conduit 20 to one end of the cylinder 1 and the chamber 19 by a conduit 21 to the opposite end of the cylinder 1. Each of the chambers 18 and 19 are connected together, within the valve block 16, and communicate through a conduit 22 to the intake manifold 23 on the internal combustion engine 23'. Air sucked out of either end of the cylinder 1 and through the conduit 20 or 21 and conduit 22 to the manifold 23 causes a reciprocating movement of the plunger 6 in the direction in which the suction is the greatest. In order to control the directional movement of the plunger 6 within the cylinder 1, so as to move said plunger in whichever direction desired, I have provided a valve control member 24 reciprocatingly guided in the valve block 16 and extending through each of the chambers 18 and 19. The control member 24 is provided with a port 25 therein, arranged so as to align with the chamber 18, when the end of said control member 24 extends across the chamber 19. The control member 24 is adapted to control the volume of air suction from either of the conduits 20 or 21 to the manifold 23 and to permit a greater suction through one conduit than the other, or vice-versa, so as to effect reciprocating movement of the plunger 6. The end of the control member 24 is pivoted at 26 to a tripper lever 27. The lever 27 is pivoted at 28 to a bracket 29 secured on the valve block 16. The lower end of the lever 27 is slotted at 30 to allow the connecting rod 7 to be passed therethrough. Within the slotted portion of the lever 27 and beneath the connecting rod 7, I have mounted a block 31 actuated by a spring 32. The spring 32 is of sufficient tension to keep the block 31 in constant frictional contact with the under periphery of the rod 7.

The invention operates in the following manner: The operator turns the steering wheel and connected steering apparatus throughout the limit of the loose-play therein, which movement causes a corresponding slight reciprocating movement of the connecting rod 7. This slight movement of the connecting rod 7 in either direction, causes a corresponding movement in the same direction of the free end of the tripper lever 27 by reason of the frictional contact of the block 31, in the lever 27, on the connecting rod 7. This movement of the lever 27 moves the valve operating member 24 from its neutral position, midway between each of the chambers 18 and 19, to a position more in one chamber than the other, so as to permit a greater amount of suction through one conduit than the other. By permitting air suction from one end of the cylinder 1, and no suction from the opposite end of the cylinder, the plunger 6 is caused to move in the direction of the greatest suction, and to thereby mechanically actuate the vehicle steering apparatus without any turning effort exerted by the vehicle operator. By turning the steering wheel in the direction opposite to that first described, the connecting rod 7 is caused to be moved in a counter direction, and the lever 27 to be flipped over into the opposite position, to change the operating position of the valve control member 24 and to divert the flow of suction from one cylinder end to the other, and consequently to cause movement of the plunger 6 and turning of the front wheels, in the opposite direction to that described in the initial operation. The tripper lever 27 which controls the in and out movement of the valve operating lever 24 moves throughout a maximum arc of one-fourth or three-eighths of an inch. The spring block 31 hugs the under side of the connecting rod 7 at all times and changes from one extreme position, to the other, during every change in directional movement of the connecting rod 7. After the tripper lever 27 has moved either to the right or left as far as possible, the connecting rod 7 continues to pass therethrough without further movement in the same direction of the tripper lever. But immediately that the connecting rod 7 moves in the reverse direction, the tripper lever 27 moves with it throughout the entire limited arc of movement that it possesses.

With my invention the initial movement of the auxiliary power steering apparatus, as well as all additional steering movement, is manually controlled by the operator utilizing the "loose-play" in the steering apparatus to regulate and control the flow of suction from the respective ends of the cylinder 1 in which the plunger 6 is reciprocatingly mounted. In order to eliminate any "vacuum" in either end of the cylinder 1, I have provided small vent openings 33, in the opposite ends of the said cylinder through which air is admitted to replace that drawn from the cylinder 1 through either end of the suction conduits 20 and 21. The vents 33 allow the plunger 6 to operate under substantially atmospheric conditions, and do away with any retarding or vacuum effects on the plunger 6 which might exist if the ends of the cylinder 1 were closed to prevent the replacement of air sucked from the said cylinder 1.

Having thus described this invention, what I claim and desire to secure by Letters Patent is:

1. A vehicle steering apparatus comprising a cylinder, having a gaseous pressure actuated plunger therein; means to connect said plunger to the vehicle steering apparatus; manual means to start movement of said plunger; and a valve actuated by movement of the plunger to regulate the flow of the gaseous medium to the cylinder to effect continued movement of the plunger.

2. A device such as described comprising a cylinder; a plunger in said cylinder having a connecting rod thereof extending outwardly through one end of said cylinder, and connected to a vehicle steering apparatus; manually operable means to start movement of said rod; and a valve actuated by movement of said rod to control the head of gaseous medium in the cylinder between the plunger and opposite ends of the cylinder to effect continued movement of the plunger connecting rod, and operation of the vehicle steering apparatus.

3. A device such as described comprising a cylinder closed at its opposite ends; a plunger in said cylinder; a rod on said plunger extended on through an end of said cylinder and connected to a vehicle steering apparatus; a gaseous medium communicating with the opposite ends of said cylinder to reciprocate said plunger therein; vents in the opposite ends of said cylinder; manually operable means to start movement of said plunger rod; and a valve actuated by movement of said rod to control the head of gaseous medium in the cylinder between the plunger and opposite ends of the cylinder to effect continued movement of the plunger connecting rod and mechanical operation of the vehicle steering apparatus.

4. A device such as described comprising a cylinder closed at its opposite ends; a plunger in said cylinder; a rod on said plunger extended on through an end of said cylinder and connected to a vehicle steering apparatus; suction conduits from an engine communicating with the opposite ends of the cylinder to cause reciprocating movement of the piston therein; a valve controlling the suction from the opposite ends of the cylinder; manually operable means to regulate movement of the plunger rod and control actuation of said suction control valve to govern the reciprocative action of the cylinder plunger and control movement of the wheel steering apparatus.

5. A device such as described comprising a cylinder closed at its opposite ends; a plunger in said cylinder; a rod on said plunger extended on through an end of said cylinder and connected to a vehicle steering apparatus; suction conduits from an engine communicating with the opposite ends of the cylinder to cause reciprocating movement of the piston therein; a valve controlling the suction from the opposite ends of the cylinder; air vents in each of the opposite ends of the cylinder; manually operable means to regulate movement of the plunger rod and control actuation of said suction control valve to govern the reciprocative action of the cylinder plunger and control movement of the wheel steering apparatus.

In testimony whereof, I have hereunto set my hand at San Francisco, California, this 28 day of February, 1925.

BETHEL J. MARTIN.